US006033148A

United States Patent [19]

Norfolk et al.

[11] Patent Number: 6,033,148

[45] **Date of Patent: *Mar. 7, 2000**

[54] HOUSING FOR A BOAT LIFT MOTOR, PULLEY AND GEAR DRIVE

[75] Inventors: Lynn P. Norfolk; David Charles Peterson, Jr., both of Edgewater; Ronald Price Ranere, Chesapeake Beach; Russell V. Welton, Grasonville, all of Md.

[73] Assignee: Norfolk Fabrication, Inc., Mayo, Md.

[ * ] Notice: This patent is subject to a terminal disclaimer.

[21] Appl. No.: 09/149,287

[22] Filed: Sep. 9, 1998

Related U.S. Application Data

[63] Continuation of application No. 08/680,407, Jul. 15, 1996, Pat. No. 5,810,508.

[51] Int. Cl.[7] .......... F16H 57/02

[52] U.S. Cl. .......... 405/3; 74/606 R; 114/44; 405/221

[58] Field of Search .......... 405/3, 7, 218, 405/219, 221; 114/44, 45, 48; 74/606 R

[56] References Cited

U.S. PATENT DOCUMENTS

| | | | |
|---|---|---|---|
| 4,026,163 | 5/1977 | Merkert | 74/425 |
| 4,678,366 | 7/1987 | Williamson | 405/3 |
| 5,287,770 | 2/1994 | Mudd | 74/606 R |
| 5,345,834 | 9/1994 | Hayashi | 74/421 A |
| 5,560,735 | 10/1996 | Lammers | 405/3 X |

*Primary Examiner*—David Bagnell
*Assistant Examiner*—Tara L. Mayo
*Attorney, Agent, or Firm*—Diller, Ramik & Wight, PC

[57] ABSTRACT

A boat lift motor and drive assembly includes a rigid mounting plate supporting a boat lift motor, a drive shaft thereof carrying a drive pulley, a pulley belt entrained about the drive pulley and a driven pulley, the driven pulley being connected to a shaft of a worm gear, the worm gear being in mesh with a drive gear, and the drive gear being connected to an output shaft which is in turn connected to a reel having wound thereon a boat lift cable which is connected to a boat platform for lifting and lowering a boat resting thereon. The lift motor and drive assembly as covered by a housing defined by first and second housing bodies with a first of the housing bodies including a recess for receiving the driven pulley and accommodating the same and also including a frusto-conical wall defining a protective shroud for the winding reel shaft.

19 Claims, 4 Drawing Sheets

HOUSING FOR A BOAT LIFT MOTOR, PULLEY AND GEAR DRIVE

CROSS-REFERENCE TO RELATED APPLICATION

This application is a continuation application of U.S. patent application Ser. No. 08/680,407 filed Jul. 15, 1996 in the name of Lynn P. Norfolk et al., and now U.S. Pat. No. 5,810,508 issued on Sep. 22, 1998.

BACKGROUND OF THE INVENTION

It has been conventional for many years to provide boat lifts immediately adjacent docks, piers and the like to lift boats out of the water to effect temporary or relatively permanent storage, maintenance and minor service and/or repair. A platform preferably provided with a custom hull support upon which a boat rests is lifted and lowered through a winching system which includes steel cables wound upon winding reels or drums which are in turn secured to reel shafts journalled for rotation upon a relatively rigid mounting plate. The mounting plate also carries an electric motor which through a pair of pulleys and a pulley belt imparts rotation through a gear drive to a shaft of the winding reel. Two such boat lift motors and drive assemblies might be utilized for lifting the boat relative to water, each on the same side of the boat, one adjacent the bow and one adjacent the stern. By selectively energizing the electric motors, a boat resting upon the platform can be lifted and lowered for ingress/egress and storage/servicing purposes.

Such boat lift systems are highly advantageous since they protect boat hulls from damage which might be caused by storms, wave action and tides. Boat bottom cleaning and/or painting is minimized and, therefore, sluggish boat performance caused by fouled boat bottoms is markedly reduced. Obviously, trailer launching and loading is avoided and boat damage common thereto is likewise eliminated. Furthermore, the news of approaching storms and high winds no longer requires a trip to the marina or dock to check the lines of a conventionally moored floating boat. Thus, boat lift motor and drive systems allow more time for boating in an enjoyable manner absent the inherent worries stemming from floating boat mooring.

Such conventional boat lift drive systems, unfortunately, are subject to corrosion and electrolysis because they are left unprotected from the elements. Water, particularly salt water, is extremely corrosive, but dirt and debris can create wear and premature parts failure. Electric motors are particularly adversely effected from exposure to the elements and an expected day of joyful boating can be cut short abruptly when a boater finds an electric lift motor has been burned out, and a part or all of an otherwise enjoyable day of boating is devoted to acquiring a new motor and effecting repair and replacement for subsequent boat outings.

SUMMARY OF THE INVENTION

In keeping with the foregoing, the primary object of the present invention is to provide a boat lift motor and drive assembly, and more particularly a housing therefor which includes first and second housing bodies cooperatively defining a chamber which houses the boat lift motor, the pulley drive and the gear drive. The first and second housings are removably secured to each other, the first housing has an opening through which projects an output shaft for rotating a cable reel or drum, and a substantially vertically disposed wall portion of the first housing body defines an inwardly opening generally concave chamber which partially receives therein a pulley of the associated pulley drive. Thus, all major operative components of the assembly, namely, the motor, the pulley drive and the gear drive, are totally housed and protected from adverse environments which substantially reduces the adverse effects caused thereby, such as damage from corrosion, electrolysis, rust, short circuiting, etc.

Preferably, a raised annular wall portions surrounds the opening for reinforcing the first body portion adjacent the opening, and the first housing body further includes vertically and horizontally outwardly projecting ribs which merge with each other. The horizontally disposed rib defines a transverse reinforcement for the overall housing and the vertical rib defines the aforesaid inwardly opening generally concave chamber or recess in which a portion of the pulley is accommodated and protected.

The housing bodies are each provided with mating peripheral portions, and the latter are secured together in a removable fashion to permit the second housing body to be totally removed to gain access to the boat lift motor and the components of the drive assembly.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 2:
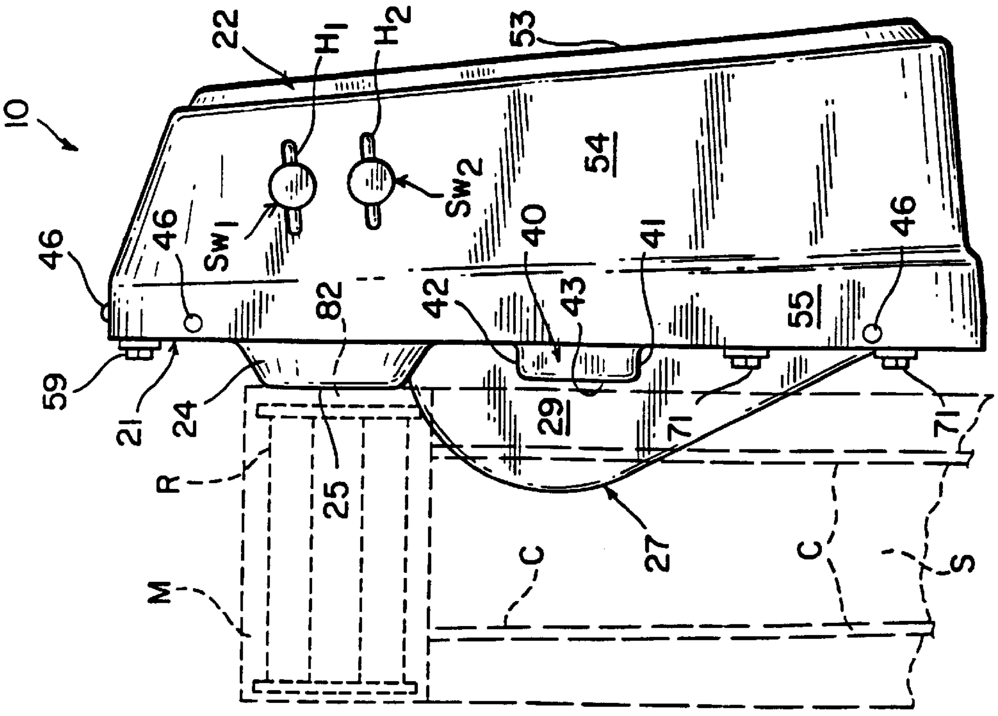
FIG. 2 is a side elevational view of the boat lift motor and drive assembly, and clearly illustrates the relationship thereof to an associated support shown in phantom outline and a pair of switches associated with a side wall portion of the second housing body.
Figure 1:
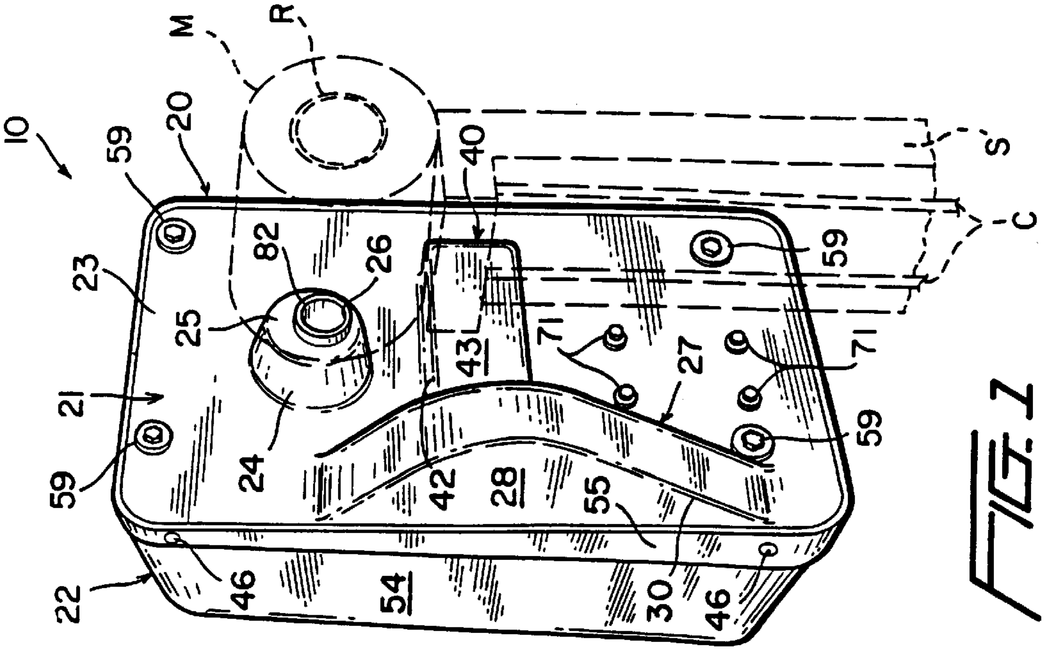
FIG. 1 is a rear perspective view of a novel boat lift motor and drive assembly of the present invention, and illustrates a housing defined by first and second housing bodies with the first housing body including a raised annular portion surrounding a cable winding reel shaft and another generally vertically disposed raised portion defining an inwardly opening recess for accommodating a pulley of a pulley drive.

A novel boat lift motor and drive assembly constructed in accordance with this invention is illustrated in FIGS. 1, 2, 4 and 5 of the drawings and is generally designated by the reference numeral 10.

The boat lift motor and drive assembly 10 is supported from an upper end portion of a vertically oriented galvanized metallic support S (FIGS. 1 and 2) which is of a hollow transverse rectangular cross-sectional configuration. The support S has welded or otherwise secured thereto a cylindrical galvanized metal protective mesh cover M in which is housed a reel or drum R upon which is wound or unwound stainless steel cable C. The boat lift motor and drive assembly 10 is essentially suspendingly cantilever-supported from the upper end portion of the support S through the reel R, a shaft associated therewith, and associated bearings having stationary outer races fixed to the upper end portion of the support S in a conventional manner.

The boat lift motor and drive assembly 10 includes a housing 20 which is defined by first and second housing bodies 21, 22, respectively.

The first housing body 21 is constructed from a single generally homogeneous piece of synthetic polymeric or copolymeric plastic material or reinforced fiberglass or the equivalent thereof, and includes a generally main wall 23 having at an upper end portion thereof a generally frusto-conical or cylindrical wall portion 24 having a radially inwardly directed annular wall portion 25 terminating in and defining a generally circular opening 26.

Adjacent one side of the main wall 23 is a generally vertically disposed convexly outwardly directed rib 27 defined by side wall portions 28, 29 and a central wall portion 30. The convex rib 27 is hollow and thus defines a vertically disposed generally concave portion chamber or recess 35 (FIGS. 4 and 5), the structure and function of which will be described more fully hereinafter.

The main wall 23 of the first housing body 21 includes a substantially horizontally disposed reinforcing rib 40 of a hollow configuration which merges with the rib 27 and is defined by side wall portions 41, 42 and a central wall portion 43. The reinforcing rib 40 is of its maximum height at its point of merger with the wall 29 of the rib 27 and progressively tapers away from the wall portion 29 and smoothly merges with the main wall 23, as is most evident in FIG. 1 of the drawings.

Figure 5:
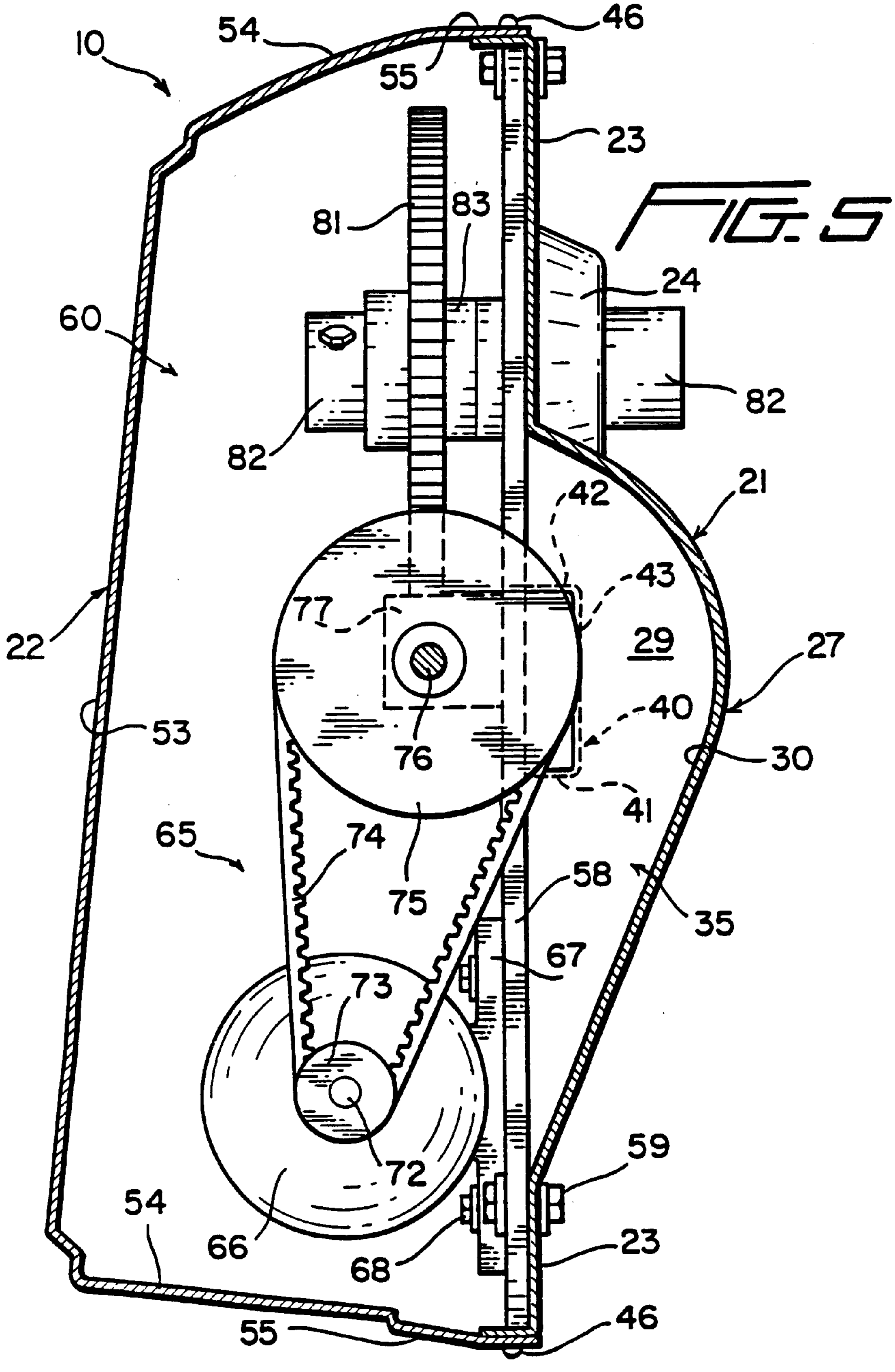
FIG. 5 is a cross-sectional view taken generally along line 5—5 of FIG. 4, and illustrates the manner in which the driven pulley is partially housed within a chamber or recess of the vertically disposed wall portion of the first housing body.

A peripheral edge portion or peripheral edge 44 of the first housing body 21 is provided with a plurality of openings 45 into which are received screws or similar fastening means 46 (FIG. 5) which unite the first housing body 21 to the second housing body 22, as is most apparent from FIG. 5 of the drawings.

Figure 3:
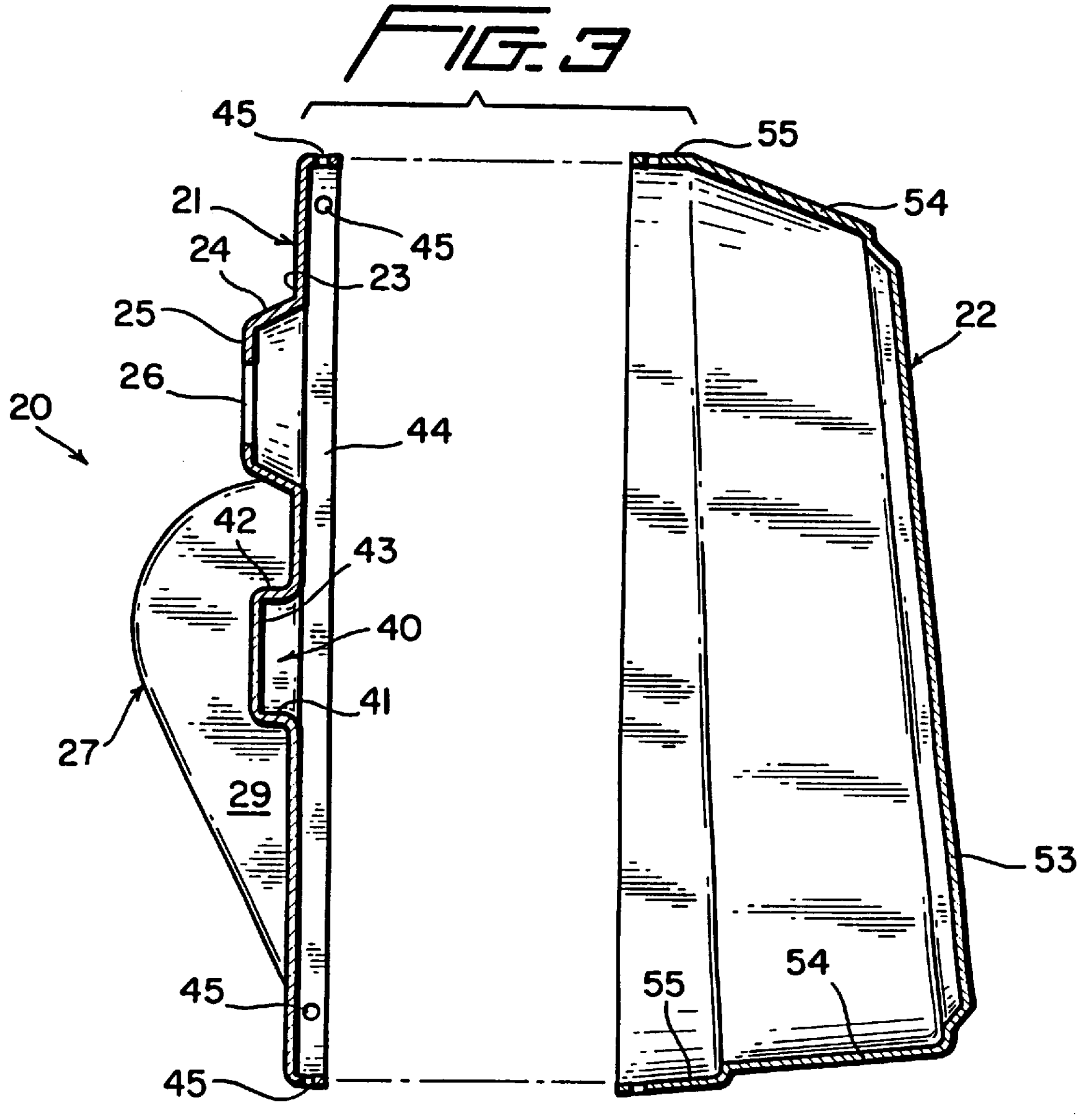
FIG. 3 is a vertical cross-sectional view through the housing with the first and second housings bodies separated from each other, and illustrates the cross-sectional configuration thereof including matching peripheral edges and a horizontal reinforcing rib of the first housing body.
Figure 4:
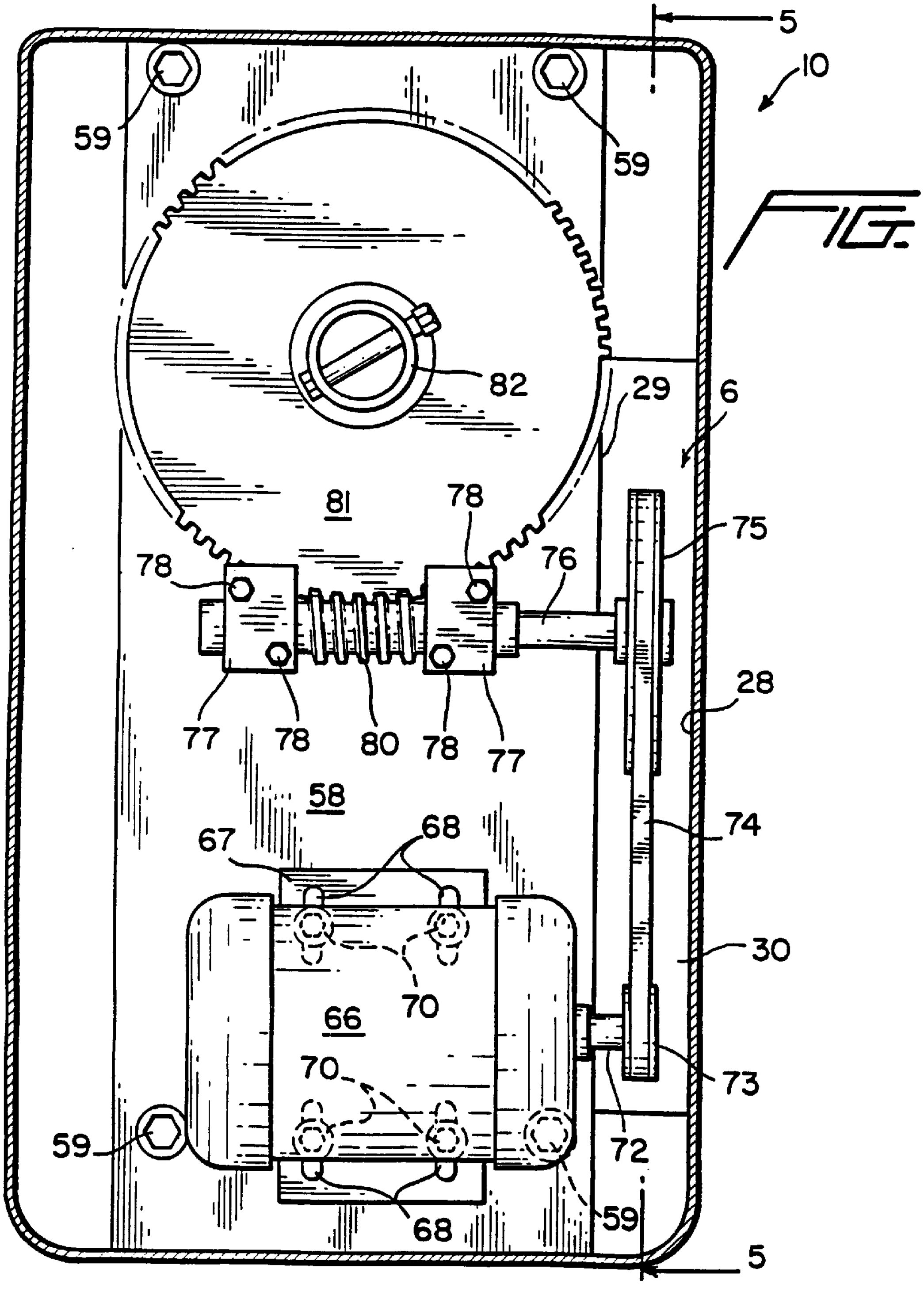
FIG. 4 is a longitudinal sectional view through the boat lift motor and drive assembly, and illustrates a relatively rigid mounting plate supporting a winding reel output shaft coupled to a gear meshed with a worm gear which in turn is driven by a driven pulley through a pulley belt connected to a drive pulley rotated by a drive shaft of an electric boat lift motor.

The second housing body 22 is likewise constructed from a single piece of generally homogeneous polymeric or copolymeric plastic material or reinforced fiberglass or the equivalent thereof, and includes a main generally rectangular wall 53 merging with a peripheral wall 54 which in turn merges with a peripheral edge 55 which conforms to the configuration of the peripheral flange 44 of the first housing body 21. The edge 55 has a number of internally threaded nuts (not shown) molded therein into which of each can be threaded one of the screws 46. Thus, each screw 46 can be unthreaded to remove its end from its associated opening 45 at which time the second housing body 22 can be totally removed from the first housing body 21, as is illustrated in FIG. 3. When the first and second housing bodies 21, 22, respectively, are reassembled together, the screws 46 are simply threaded into their associated nuts and into the openings 45 to maintain the second housing body 22 assembled in closed relationship to the first housing body 21 to define therewith an internal chamber 60 substantially closed to external environment, such as fresh and/or salt water, dirt, etc.

The boat lift motor and drive assembly 10 further includes a drive mechanism 65 (FIGS. 4 and 5) supported from a relatively rigid mounting plate 58 which is in turn secured to the main wall 23 of the first housing body 21 by four sets of nuts, bolts and washers which are collectively identified by the reference numeral 59.

The drive mechanism 65 includes an electric boat lift motor 66 having a housing (unnumbered) which includes a motor mounting plate or foot 67 which in turn includes four elongated slots 68 having generally vertically disposed longitudinal axes (unnumbered). Bolts 70 pass through the slots 68 and through circular openings in both the mounting plate 58 and the main wall 23 of the first housing body 21. A nut 71 (FIG. 1) is fastened to each of the bolts 70 to hold the electric motor 66 in a desired position of vertical adjustment. The motor 66 includes a drive shaft 72 to which is keyed a drive pulley 73. A pulley belt 74 is entrained about the drive pulley 73 and about a larger driven pulley 75 which is in turn keyed to a driven shaft 76. The driven shaft 76 is conventionally journalled in bearings (not shown) housed in bearing mounts 77 which are secured by nuts and bolts 78 to the main mounting plate 58. A first gear or worm gear 80 is rotated by the shaft 76 and meshes with a second gear 81 which is keyed to an output shaft, winding reel shaft or drum shaft 82 which projects outwardly through the opening 26 of the main wall 21. A bearing housing 83 is fixed to the main mounting plate 58 and houses a bearing mounting the output shaft 82 for supported rotation upon rotation of the gear 81. The output shaft 82 extends into the inner race (not shown) of the reel R (FIG. 2). Thus, the inner and outer races (not shown) of the reel R not only mount the reel R for rotation upon rotation of the shaft 82, but these bearings also suspend the boat lift motor and drive assembly 10 in a suspended cantilevered fashion relative to the upper end portion of the support S. A conventional bracket or strap B (FIGS. 1 and 2) is conventionally connected between the support S and the housing 20 of the boat lift motor and drive assembly 10 to prevent the latter from bodily rotating when the shaft 82 is rotated.

Conventional switches Sw1, Sw2 (FIG. 2) are conventionally mounted relative to the housing 20 and handles H1, H2, respectively, are accessible exteriorly of the housing 20. The switches Sw1, Sw2 are connected one to the electric motor 66 and another to the electric motor (not shown) of another identical boat lift motor and drive assembly (not shown) mounted adjacent another support S (also not shown) with the assemblies 10 being appropriately located adjacent a dock or pier and adjacent the bow and stern of the same side of the boat which is to be raised and lowered thereby. The upper switch Sw1 is connected to the motor 66 while the switch Sw2 would be connected to the other electric motor, and by selectively manipulating the switches Sw1, Sw2 by rotating the handles H1, H2, respectively, the motors 66 can be selectively rotated to rotate the drive shafts 72 thereof which through the appropriate drive pulleys, drive belt and gearing will raise or lower a boat through the cable winding reels R appropriately winding in or paying out the cable C.

It is to be particularly noted that the chamber 60 (FIGS. 4 and 5) totally encloses all of the components of the overall drive mechanism 65 and prevents internal contamination from the environment. Furthermore, the frusto-conical wall portion 24 and the annular wall portion 25 define a shroud which also minimizes and appreciably reduce, infiltration of environmental materials into the chamber 65 through the opening 26 which is in extremely close relationship to the exterior surface (unnumbered) of the output shaft 82.

Furthermore, since the driven pulley 75 is partially housed within the concave chamber or chamber portion 35, the overall depth of the chamber 60 and the housing 20 can be materially reduced. Lastly, the transverse or generally horizontal rib 40 rigidifies not only the main wall 21 but the overall housing 20 and prevents any type of deflection or canting, particularly during starting of the electric motor 66 which tends to torque the housing assembly 10 when initial rotation is imparted to the output shaft 82. Thus, in this fashion the drive mechanism 65 and its individual components are protected, yet are relatively accessible, in a highly aesthetic housing 20.

Although a preferred embodiment of the invention has been specifically illustrated and described herein, it is to be understood that minor variations may be made in the apparatus without departing from the spirit and scope of the invention, as defined the appended claims.

We claim:

1. A boat lift drive assembly and housing comprising a mounting plate, a boat lift drive assembly carried by said mounting plate; said boat lift drive assembly including a drive motor for rotating a pulley which drives a gear connected to an output shaft; said pulley and output shaft each having an axis of rotation, said axes of rotation are substantially normal to each other, said output shaft axis being substantially coaxial to an opening in said mounting plate, said pulley having pulley portions disposed at opposite sides of a plane through said mounting plate, said housing including first and second housing bodies cooperatively defining a chamber housing said boat lift drive assembly, said first housing body having an opening aligned with said mounting plate opening aligned with said mounting plate opening and an inwardly opening generally concave chamber at least partially receiving therein a portion of said pulley, means for securing said first housing body to said mounting plate, and means for securing said second housing body to said first housing body.

2. The boat lift drive assembly and housing as defined in claims 1 wherein said means for securing said second housing body to said first housing body secure peripheral portions of said first and second housing bodies to each other.

3. The boat lift drive assembly and housing as defined in claim 2 wherein said first housing body includes a peripheral edge substantially entirely encompassing a peripheral edge of said mounting plate, and said means for securing said second housing body to said first housing body secure said first housing body peripheral edge to a peripheral edge of said second housing body.

4. The boat lift drive assembly and housing as defined in claim 2 wherein said first housing body includes a main wall defining a panel beyond which projects said concave chamber, another wall of said first housing body projects beyond said main wall, and said another wall defines said first body opening.

5. The boat lift drive assembly and housing as defined in claim 1 wherein said first housing body includes a peripheral edge substantially entirely encompassing a peripheral edge of said mounting plate, and said means for securing said second housing body to said first housing body secure said first housing body peripheral edge to a peripheral edge of said second housing body.

6. The boat lift drive assembly and housing as defined in claim 1 wherein said first housing body includes a main wall defining a panel beyond which projects said concave chamber, another wall of said first housing body projects beyond said main wall, and said another wall defines said first body opening.

7. A cover for a boat lift motor, pulley drive, gear drive and mounting plate comprising a body including a substantially uniplanar main body wall defining an upper, lower and first and second opposite side body wall portions, a substantially vertically disposed wall portion projecting out of a plane of said main body wall adjacent and substantially parallel to one of said first and second side body wall portions, said substantially vertically disposed wall portion defining a substantially concave chamber opening generally inwardly of said main body wall and being adapted to at least partially receive therein a pulley of an associated pulley drive, an opening in the main body wall through which is adapted to project a gear drive shaft, said opening including an axis disposed substantially normal to a plane of said main body wall, and said opening axis being located between said substantially vertically disposed wall portion and the other of said first and second side body wall portions and respectively more adjacent to and more remote from said upper and lower body wall portions.

8. The cover as defined in claim 7 including a substantially peripheral wall portion projecting in the same direction as said substantially vertically disposed wall portion, and said substantially peripheral wall portion defines said opening.

9. The cover as defined in claim 8 including means in said main body wall through which fasteners pass for securing said cover to an associated mounting plate.

10. The cover as defined in claim 9 wherein said main body wall is surrounded by a peripheral flange, and further including means defined by said peripheral flange for accommodating fasteners therein to assemble said cover with an associated mounting cover.

11. The cover as defined in claim 8 wherein said main body wall is surrounded by a peripheral flange, and means defined by said peripheral flange for accommodating fasteners therein to assemble said cover with an associated mounting cover.

12. The cover as defined in claim 11 including further wall portions projecting from said uniplanar main body wall for reinforcing the same.

13. The cover as defined in claim 12 including means in said main body wall through which fasteners pass for securing said cover to an associated mounting plate.

14. The cover as defined in claim 8 including further wall portions projecting from said uniplanar main body wall for reinforcing the same.

15. The cover as defined in claim 7 including means in said main body wall through which fasteners pass for securing said cover to an associated mounting plate.

16. The cover as defined in claim 7 wherein said main body wall is surrounded by a peripheral flange, and means defined by said peripheral flange for accommodating fasteners therein to assemble said cover with an associated mounting cover.

17. The cover as defined in claim 7 including further wall portions projecting from said uniplanar main body wall for reinforcing the same.

18. A boat lift drive assembly and cover comprising a mounting plate, a boat lift drive assembly carried by said mounting plate; said boat lift drive assembly including a drive motor for rotating a pulley which drives a gear connected to an output shaft; said pulley and output shaft each having an axis of rotation, said axes of rotation are substantially normal to each other, said output shaft axis being substantially coaxial to an opening in said mounting plate, said pulley having pulley portions disposed at opposite sides of a plane through said mounting plate, said cover including a substantially uniplanar main body wall defining an upper, lower and first and second opposite side body wall portions, a substantially vertically disposed wall portion projecting out of a plane of said main body wall adjacent and substantially parallel to one of said first and second side body wall portions, said substantially vertically disposed wall portion defining a substantially concave chamber opening generally inwardly of said main body wall and at least partially receiving therein said pulley, an opening in the main body wall through which projects said drive shaft, said opening including an axis disposed substantially normal to a plane of said main body wall, and said opening axis being located between said substantially vertically disposed wall portion and the other of first and second side body wall portions and respectively more adjacent to and more remote from said upper and lower body wall portions.

19. The boat lift drive assembly and cover as defined in claim 18 wherein said main body wall includes a peripheral edge substantially entirely encompassing a peripheral edge of said mounting plate.

* * * * *